US 6,700,968 B2

(12) United States Patent
Tucker et al.

(10) Patent No.: US 6,700,968 B2
(45) Date of Patent: *Mar. 2, 2004

(54) METHOD AND SYSTEM FOR PROVIDING MULTIPLE SERVICES PER TRIGGER

(75) Inventors: Brenda N. Tucker, Roswell, GA (US); David A. Scott, Norcross, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 10/347,458

(22) Filed: Jan. 21, 2003

(65) Prior Publication Data

US 2003/0108174 A1 Jun. 12, 2003

Related U.S. Application Data

(63) Continuation of application No. 09/323,677, filed on Jun. 2, 1999, now Pat. No. 6,532,285.
(60) Provisional application No. 60/129,116, filed on Apr. 14, 1999.

(51) Int. Cl.[7] .................................................. H04M 3/32

(52) U.S. Cl. ...................... 379/207.02; 379/201.01; 379/211.02; 379/215.01; 379/221.08

(58) Field of Search ................... 379/201.01, 201.02, 379/201.05, 207.02, 207.04, 207.05, 88.17, 211.02, 215.01, 221.08, 230, 900

(56) References Cited

U.S. PATENT DOCUMENTS 5,367,566 A * 11/1994 Moe et al. .................. 379/243
5,430,719 A *  7/1995 Weisser, Jr. ................ 370/58.2
5,802,160 A *  9/1998 Kugell et al. ........... 379/211.04

(List continued on next page.)

FOREIGN PATENT DOCUMENTS

| EP | 578 964 A2 | | 1/1994 |
| GB | 2 315 639 A | * | 4/1998 |
| WO | WO 97 50232 A | | 12/1997 |
| WO | WO 98 21899 A | | 5/1998 |
| WO | WO 98 44707 A | | 10/1998 |

OTHER PUBLICATIONS

Brenda N. Tucker, Architecture Concept to Support Multiple Services Per Trigger (MS/T) Prototype, Draft—Issue 1, Dec. 10, 1998.
TIA/EIA, Cellular Radio Telecommunications Intersystem Operations: Signalling Protocols, Jan. 3, 1996.

*Primary Examiner*—Bing Bui
(74) *Attorney, Agent, or Firm*—Shaw Pittman LLP

(57) ABSTRACT

The present invention allows a single trigger, such as a Termination Attempt Trigger, to invoke multiple feature service logic programs (feature SLPs) through the use of a Feature Interaction Manager service logic program (FIM-SLP) installed at a service control point (SCP). A database, accessible by the service control point, contains subscriber information such as the type of services subscribed and the order in which the services are to be invoked. The Feature Interaction Manager service logic program invokes individual feature SLPs based on the information contained in the database that specify how the feature SLPs will interact. In one embodiment, the present invention allows multiple services to be deployed within a common service control point. In a different embodiment, the Feature Interaction Manager service logic program located in a first service control point can also invoke features SLPs that are located in other service control points. The Feature Interaction Manager SLP and the feature SLPs can reside on the same SCP. Alternatively, the Feature Interaction Manager SLP and feature SLPs can reside on multiple SCPs. In the case of multiple SCPs, the Feature Interaction Manager SLP can reside by itself or can be co-located with one or more feature SLPs.

44 Claims, 8 Drawing Sheets

U.S. PATENT DOCUMENTS

| | | | | |
|---|---|---|---|---|
| 5,920,618 A | * | 7/1999 | Fleischer, III et al. | 379/221.09 |
| 5,946,383 A | * | 8/1999 | Havens et al. | 379/221.09 |
| 5,966,434 A | * | 10/1999 | Schafer et al. | 379/201.01 |
| 5,999,610 A | * | 12/1999 | Lin et al. | 379/207.02 |
| 6,018,574 A | * | 1/2000 | Malik | 379/219 |
| 6,144,644 A | * | 11/2000 | Bajzath et al. | 370/259 |
| 6,327,355 B1 | * | 12/2001 | Britt | 379/201.03 |
| 6,453,161 B1 | * | 9/2002 | Touati et al. | 455/433 |

* cited by examiner

METHOD AND SYSTEM FOR PROVIDING MULTIPLE SERVICES PER TRIGGER

This application is a continuation and claims priority from U.S. patent application Ser. No. 09/323,677, filed Jun. 2, 1999 now U.S. Pat. No. 6,532,285, which claims the benefit of U.S. Provisional Patent Application Ser. No. 60/129,116 filed Apr. 14, 1999.

BACKGROUND

1. Field of the Invention

The present invention relates generally to telecommunication systems and more particularly relates to a method and system for providing multiple services per trigger to a subscriber.

2. Background of the Invention

In the telecommunication industry today, many advanced services are available to telephone line subscribers in which a customer can set up her telephone line in such a way that a number of tasks could be performed by the telephone system before ringing the subscriber's telephone. For example, in an advanced intelligent network (AIN) structure, the Flexible Call Forwarding service allows a Flexible Call Forwarding subscriber to receive all calls made to her home telephone number at any location she so designates. AIN structures are described in U.S. Pat. No. 5,701,301, which is hereby incorporated by reference. The Flexible Call Forwarding service can be provided through the use of a Termination Attempt Trigger (TAT) and the Flexible Call Forwarding Service Logic Program (SLP). The Flexible Call Forwarding service is one example of several services that are implemented using feature SLPs. Feature SLPs are software subsystems implemented in, e.g., a Service Control Point, that are used to provide specific services to subscribers. The TAT is located at the service switching point (SSP) to which the Flexible Call Forwarding subscriber's telephone line is physically connected. The Flexible Call Forwarding SLP helps the SCP process queries originating from the TATs of Flexible Call Forwarding subscribers. For example, when a Flexible Call Forwarding subscriber's telephone number is dialed by a caller, prior to ringing the Flexible Call Forwarding subscriber's telephone, the TAT sends an AIN query to the SCP. The AIN query contains a specific Translation Type that is unique for all TATs serving Flexible Call Forwarding subscribers. In a preferred embodiment, this AIN query goes through a signal transfer point (STP) where the Translation Type prompts the STP to add a subsystem number specific to the Flexible Call Forwarding SLP to the query. Thus each subsystem number is unique to a specific subsystem of the SCP. The Flexible Call Forwarding SLP then goes through appropriate steps to process that call. If the Flexible Call Forwarding service has been activated by the Flexible Call Forwarding subscriber, the call is routed to the predetermined destination as designated by the Flexible Call Forwarding subscriber. Otherwise, the Flexible Call Forwarding SLP prompts the SCP to send an instruction authorizing the SSP to put the call through to the default location.

Similarly, when an Internet Call Waiting subscriber's telephone number is dialed, the Internet Call Waiting subscriber's SSP sends a query to the SCP asking for instructions before allowing the call to go through. The SCP, through the Translation Type and the subsystem number that are specific to the Internet Call Waiting subscriber's TAT and the Internet Call Waiting SLP, respectively, consults the Internet Call Waiting SLP to determine whether the Internet Call Waiting subscriber had activated the Internet Call Waiting service. If the Internet Call Waiting service has been activated by the Internet Call Waiting subscriber, the SCP sends an authorization to the SSP to put the call through, and the subscriber is alerted that there is an incoming call waiting while she is connected to the Internet. Otherwise, the Internet Call Waiting SLP would cause the SCP to send a different instruction directing the SSP to inform the caller that the Internet Call Waiting subscriber's telephone line is busy or is otherwise unavailable.

One major limitation of the current AIN structure is that each TAT can only invoke one feature SLP. In other words, a Flexible Call Forwarding subscriber may not simultaneously subscribe to other services such as Internet Call Waiting, Privacy Director, and Messaging. This gives telephone line subscribers limited choices, despite the variety of services available to them. For example, under the current AIN structure, an Internet Call Waiting subscriber who wants to subscribe to one of the other services offered at the same AIN trigger must give up the Internet Call Waiting service.

SUMMARY OF THE INVENTION

The present invention makes it possible for a customer to subscribe to multiple services simultaneously using a single trigger, such as a Termination Attempt Trigger (TAT), that is connected to her telephone line. In a preferred embodiment, the present invention makes it possible for a single TAT to invoke multiple feature Service Logic Programs (feature SLPs) in an order determined by the Multiple Services per Trigger subscriber. The present invention provides telephone line subscribers with greater flexibility for handling incoming calls through various services, including without limitation, Flexible Call Forwarding, Internet Call Waiting, and Privacy Director and Messaging.

The setup procedures for the present invention are straightforward. In a preferred embodiment, a Multiple Services per Trigger subscriber calls the business office of the telephone company to designate the type of services she wishes to have, and the order in which the services are to be invoked. Then, a TAT is installed at the service switching point (SSP) that is physically connected to the subscriber's telephone line. A unique Translation Type specific to Multiple Services per Trigger subscribers, e.g., "220," is then assigned to the subscriber's TAT. The business office then updates a database that is accessible by a service control point (SCP) with the Multiple Services per Trigger subscription information. Following this setup, the subscriber can subsequently update the database to activate or deactivate the various services as often as she wants to.

In a preferred embodiment, various feature SLPs are present at the SCP to which all queries from SSPs are directed. The feature SLPs process incoming queries and prompt the SCP to send appropriate instructions to the SSPs from which the queries had originated. Each feature SLP performs a specific task. For example, a Flexible Call Forwarding SLP processes the incoming calls of Flexible Call Forwarding subscribers, an Internet Call Waiting SLP processes Internet Call Waiting subscribers' incoming calls, and a Privacy Director SLP processes Privacy Director subscribers' incoming calls.

The present invention is implemented by installing a Feature Interaction Manager SLP on an SCP in the network. The Feature Interaction Manager SLP manages all feature SLPs, whether the feature SLPs are located within the same SCP on which the Feature Interaction Manager SLP resides, or on other SCPs. The Feature Interaction Manager SLP has access to a database that contains subscriber information that lists which customers subscribe to which AIN service or services. The database also defines how multiple services subscribed by a single subscriber are to be invoked and the location of the SLP in the network.

For example, when a query comes from the TAT of a Multiple Services per Trigger subscriber, the unique "220" Translation Type assigned to that TAT would cause the signal transfer point (STP) to supply the corresponding subsystem number (SSN) of the Feature Interaction Manager SLP to the query. Each subsystem number is unique to a specific SLP. For example, the Flexible Call Forwarding SLP, Internet Call Waiting SLP, and Privacy Director SLP might have subsystem numbers of "1," "2," and "3," respectively. The Feature Interaction Manager SLP also has its own subsystem number. In this example, the Feature Interaction Manager's subsystem number could be "4." When the STP receives the query from the SSP with Translation Type of "220," the STP supplies subsystem number of "4" to the query and forwards the query to the SCP. When the SCP receives the query with the subsystem number "4," it routes the query to the Feature Interaction Manager SLP. The Feature Interaction Manager SLP then consults the database to find out which services the Multiple Services per Trigger subscriber had contracted for, and the service interaction rules that prescribe the order in which the subscribed services are to be invoked.

For example, if Subscriber A has ordered both Internet Call Waiting and Flexible Call Forwarding services (in that order), and Subscriber A had also activated both services, a query from her TAT would cause the Feature Interaction Manager SLP to invoke the Internet Call Waiting SLP first. The Internet Call Waiting SLP would then prompt the SCP to alert Subscriber A that a call is waiting if she is connected to the Internet. If Subscriber A is not on line or is otherwise unavailable at her telephone, the Feature Interaction Manager SLP would then invoke the next feature SLP, namely, the Flexible Call Forwarding SLP. Then, the Flexible Call Forwarding SLP would process the query by instructing the SSP to route the call to the forwarding telephone number designated by Subscriber A.

In a different example in which Subscriber B has a subscription to Flexible Call Forwarding and Internet Call Waiting services (in that order), the procedures would be reversed. In other words, all incoming calls of Subscriber B would be forwarded to the predetermined forwarding telephone number. The Internet Call Waiting SLP would be invoked only if Subscriber B had deactivated the Flexible Call Forwarding service and updated the database accordingly.

Accordingly, it is an object of the present invention to allow telephone line subscribers greater flexibility in managing incoming calls.

It is another object of the present invention to allow a single trigger to support multiple services.

It is a further object of the present invention to provide a telephone network in which additional services can be readily provided to a telephone network's subscribers.

DETAILED DESCRIPTION OF THE INVENTION

The present invention includes a Feature Interaction Manager Service logic program that manages individual feature service logic programs (feature SLPs) such as the Flexible Call Forwarding SLP, the Internet Call Waiting SLP, the Privacy Director SLP, the Advanced Intelligent Messaging SLP, and the Simultaneous Ringing SLP. The Feature Interaction Manager SLP determines the order in which multiple feature SLPs are to be invoked based on service interaction rules. The Feature Interaction Manager SLP invokes the first feature SLP and waits for a response. The Feature Interaction Manager SLP then evaluates the response from the feature SLP, and, based on the rules for how the feature SLPs interact, determines if the next feature SLP should be invoked or if the response should be sent to the SSP. This process continues as long as additional feature SLPs can be invoked.

When the Feature Interaction Manager SLP receives the appropriate response from an activated feature SLP, or when no feature SLP has been activated, the Feature Interaction Manager SLP prompts the service control point (SCP) to instruct the service switching point (SSP) from which the query had originated to process the call accordingly.

Figure 1A:
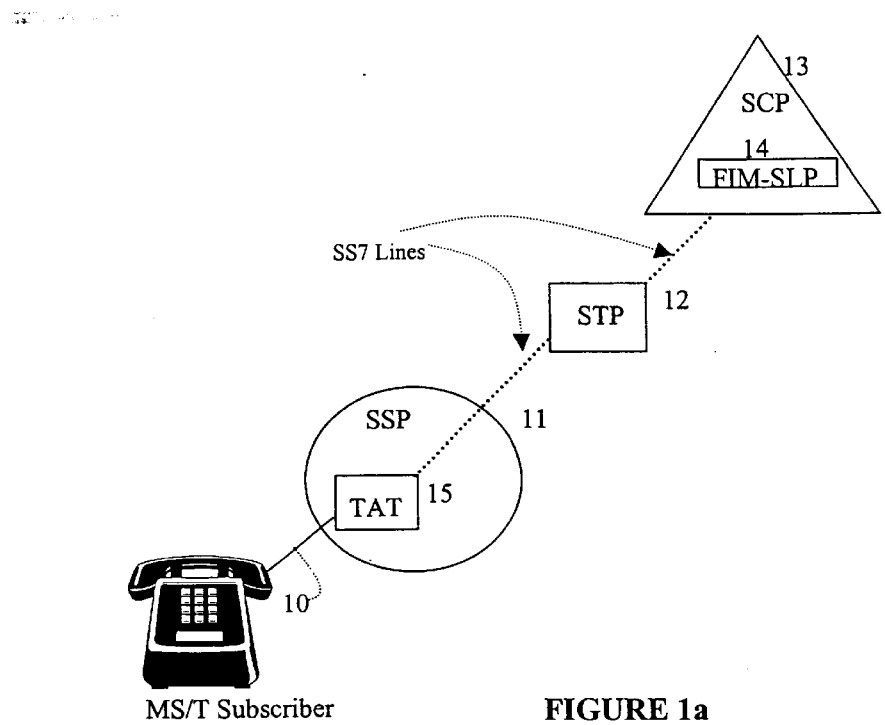
FIG. 1a is a schematic diagram illustrating an advanced intelligent network embodying a preferred embodiment of the Feature Interaction Manager ("FIM") of the present invention.

FIG. 1a is a schematic diagram illustrating an advanced intelligent network embodying a preferred embodiment of the Feature Interaction Manager ("FIM") of the present invention. As shown in FIG. 1a, a subscriber of the present invention has a telephone line 10 that is connected to an SSP 11. Subscribers who use the present invention shall be referred to herein as Multiple Services per Trigger subscribers ("MS/T Subscriber"). In a preferred embodiment, the subscriber's telephone line 10 is provisioned with a trigger, such as Termination Attempt Trigger (TAT) 15. The trigger is provisioned with a unique Translation Type that is specific for Multiple Services per Trigger subscribers. SSP 11, in turn, is connected to a signal transfer point (STP) 12 via the SS7 signaling system of the advanced intelligent network (AIN). Any query originating from the Multiple Services per Trigger subscriber's TAT 15 and sent through SSP 11 to STP 12 carries the specific Translation Type as well as the originating point code of SSP 11. When STP 12 receives the query, STP 12 supplies a corresponding subsystem number that is specific to the Feature Interaction Manager SLP (FIM-SLP) 14. In other words, a query from a non-MS/T subscriber carrying a different Translation Type does not receive the subsystem number of the Feature Interaction Manager SLP, but may receive the subsystem number that invokes a specific feature SLP. Thus, when the query from SSP 11 reaches SCP 13, the query is immediately routed to Feature Interaction Manager SLP 14.

Figure 1B:
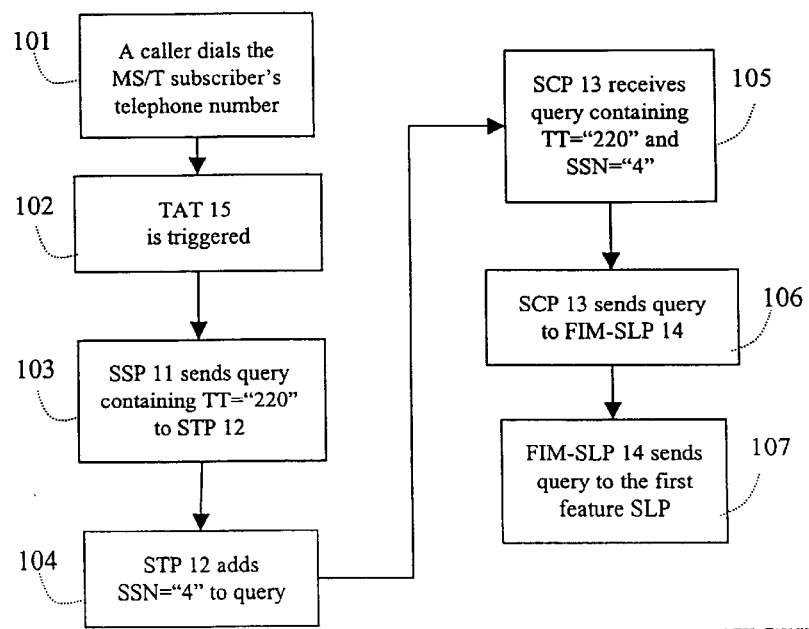
FIG. 1b is a flowchart illustrating the steps by which a query is forwarded to the Feature Interaction Manager according to a preferred embodiment of the present invention.

FIG. 1b is a flowchart illustrating the steps by which a query is forwarded to the Feature Interaction Manager according to a preferred embodiment of the present invention. In this specific example, a caller dials the telephone number of the Multiple Services per Trigger (MS/T) subscriber in step 101. Then in step 102, TAT 15 is triggered by the call. Instead of routing the call through immediately, the call is suspended. TAT 15 then prompts SSP 11, in step 103, to send a query to SCP 13 via STP 12. The query contains a Translation Type of "220" that has been assigned to TAT 15. In step 104, STP 12 recognizes the Translation Type of "220" as one that has been originated by a TAT that is assigned to a Multiple Services per Trigger subscriber. Therefore, STP 12 supplies the subsystem number "4" to the query. When SCP 13 receives the query in step 105, it recognizes the subsystem number "4" to be the subsystem number of Feature Interaction Manager SLP 14. As a result, in step 106, SCP 13 routes the query to Feature Interaction Manager SLP (FIM-SLP) 14 for processing. Finally, in step 107, Feature Interaction Manager SLP 14 processes the call according to the Multiple Services per Trigger subscriber's instructions, i.e., Feature Interaction Manager SLP 14 invokes feature SLPs in the specific order designated by the Multiple Services per Trigger subscriber.

Figure 2A:
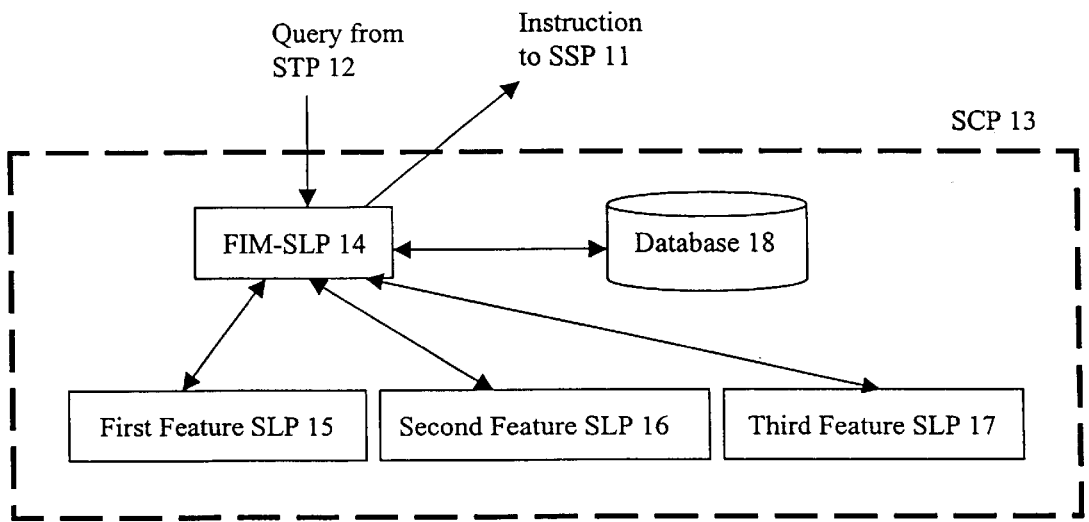
FIG. 2a is a schematic diagram illustrating a service control point (SCP) embodying a preferred embodiment of the Feature Interaction Manager of the present invention.

FIG. 2a is a schematic diagram illustrating a service control point (SCP) embodying a preferred embodiment of the Feature Interaction Manager of the present invention. In this embodiment, SCP 13 contains a Feature Interaction Manager SLP 14, a first feature SLP 15, a second feature SLP 16, and a third feature SLP 17. In this preferred embodiment, when SCP 13 receives a query from a Multiple Services per Trigger subscriber, the query is forwarded to Feature Interaction Manager SLP 14 because of the subsystem number contained in the query. Feature Interaction Manager SLP 14 then consults Database 18 that contains, among other information, a table showing different sets of valid service combinations. For example, a telephone company that offers three services such as Flexible Call Forwarding (FCF), Internet Call Waiting (ICW), and Privacy Director (PD), could have up to 15 service groups as shown in Table A below.

TABLE A

Possible Service Combinations of FCF, ICW, and PD

| Service Group Number | Order of Service Execution |
|---|---|
| 001 | FCF |
| 002 | ICW |
| 003 | PD |
| 004 | FCF, ICW |
| 005 | ICW, FCF |
| 006 | FCF, PD |
| 007 | PD, FCF |
| 008 | ICW, PD |
| 009 | PD, ICW |
| 010 | FCF, ICW, PD |
| 011 | FCF, PD, ICW |

TABLE A-continued

Possible Service Combinations of FCF, ICW, and PD

| Service Group Number | Order of Service Execution |
|---|---|
| 012 | ICW, FCF, PD |
| 013 | ICW, PD, FCF |
| 014 | PD, FCF, ICW |
| 015 | PD, ICW, FCF |

As a practical matter, however, one skilled in the art would recognize that not all the service groups shown in Table A are necessarily commercially practicable.

In addition to Table A, Database 18 might also contain a second table associating specific subscribers to their subscribed sets of valid service combinations, such as the examples of relationships shown in Table B below.

TABLE B

Customer Group Subscription Table

| Customer Telephone Number | Service Group |
|---|---|
| 404-332-2166 | 004 |
| 404-332-2189 | 006 |
| 404-332-7239 | 001 |
| 404-332-1234 | 007 |
| 404-332-2310 | 013 |
| 404-332-2361 | 005 |
| 404-332-3222 | 010 |

Database 18 might also contain a third table identifying the location of each feature SLP by point code and subsystem number, such as shown in Table C below.

TABLE C

Location of Feature SLP Table

| Feature SLP | Point Code | Subsystem Number |
|---|---|---|
| FCF | 252001230 | 1 |
| ICW | 252001230 | 2 |
| PD | 252002260 | 3 |

Figure 2B:
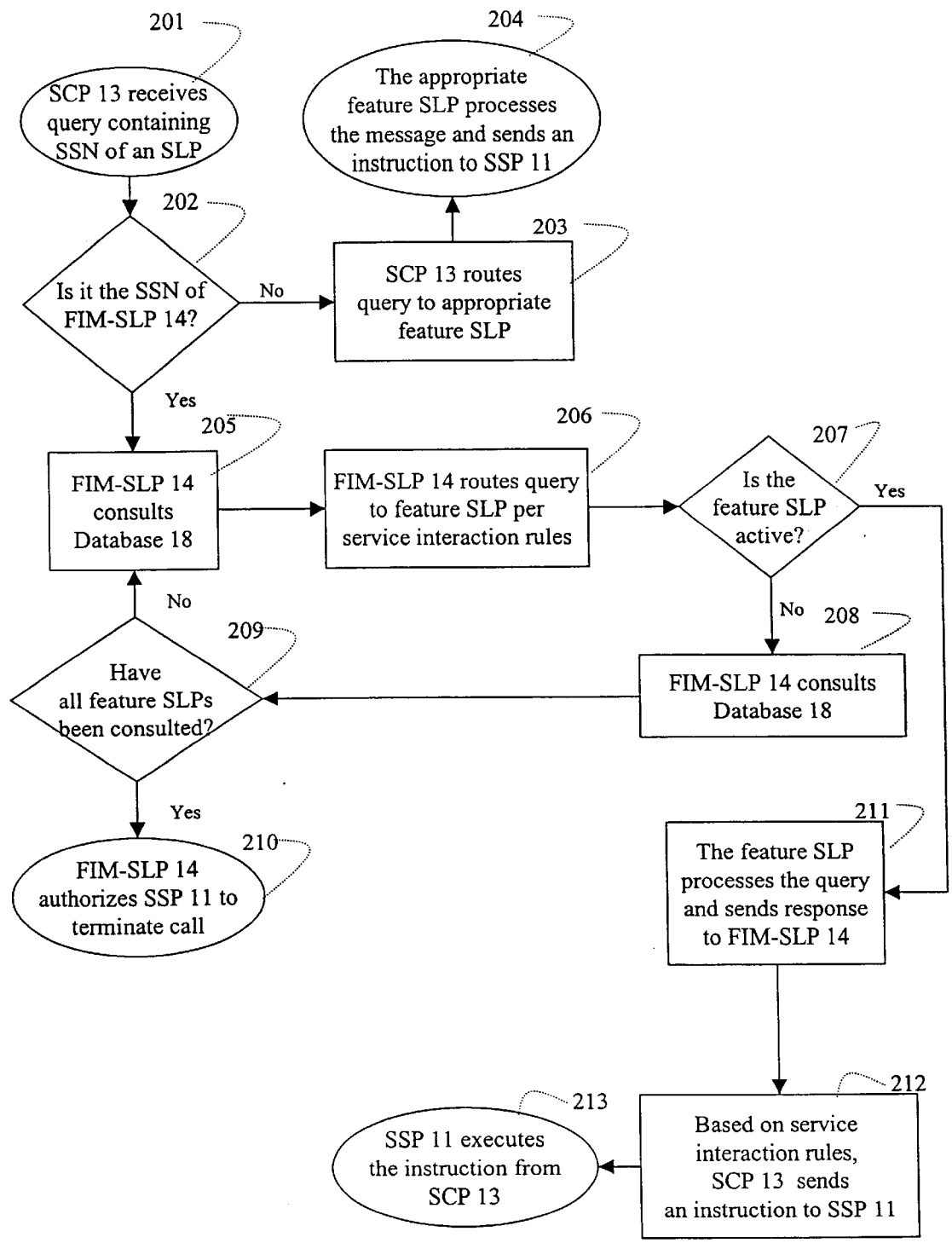
FIG. 2b is a flowchart illustrating the steps by which the Feature Interaction Manager processes a query according to a preferred embodiment of the present invention.

FIG. 2b is a flowchart illustrating the steps by which the Feature Interaction Manager processes a query according to a preferred embodiment of the present invention. In step 201, SCP 13 receives a query containing a subsystem number. In step 202, the SCP determines whether the subsystem number contained in the query matches that of Feature Interaction Manager SLP 14. If it does not, SCP 13, in step 203, routes the query to an appropriate feature SLP with the same subsystem number that is in the query, and the appropriate feature SLP would process the call in step 204.

If the subsystem number contained in the query is the subsystem number of Feature Interaction Manager SLP 14, SCP 13 channels the query to Feature Interaction Manager SLP 14. In step 205, Feature Interaction Manager SLP 14 consults Database 18. From a table such as Table B above, Feature Interaction Manager SLP 14 determines the specific feature SLPs to which the Multiple Services per Trigger subscriber has subscribed. Furthermore, from a table such as that shown in Table A, Feature Interaction Manager SLP 14 determines the order in which the feature SLPs are to be invoked. As a result, in step 206, Feature Interaction Manager SLP 14 routes the query to the appropriate feature SLP based on the information in Table C in Database 18.

In step 207, if that feature SLP has not been activated, the process returns to Feature Interaction Manager SLP 14 in step 208 to consult Database 18 for the next feature SLP. The process in the loop of steps 205, 206, 207, 208, and 209 continues until an activated feature SLP is found or all feature SLPs in the service group have been consulted and no activated service is found. Once the end of the list is encountered in step 209, the process stops in step 210 where Feature Interaction Manager SLP 14 authorizes SSP 11 to terminate the call.

If in step 207 the feature SLP has been activated, it processes the query in step 211 and sends a response to the Feature Interaction Manager SLP 14. In step 212, Feature Interaction Manager SLP 14 consults Database 18 for the rules defining how the feature SLPs interact (i.e., the service interaction rules) to determine what response should be sent to SSP 11. In step 213, SSP 11 executes the instruction received from SCP 13

For each combination or permutation shown in Table A, service interaction rules on how the services would interact must be defined and be available to the Feature Interaction SLP. For example, the service interaction rules for Service Group 004 might be as follows:

| Execute Flexible Call Forwarding SLP | |
|---|---|
| State After Execution | Next Action |
| (1) Forward-call | Forward_Call |
| (2) Allow-call | Execute Internet Call Waiting SLP |
| | State After Execution    Next Action |
| | (a) Accept-call    Authorize_Termination |
| | (b) Reject-call    Disconnect |
| | (c) Timeout, Default    Authorize_Termination |
| (3) Block-call | Send_to_Resource |
| (4) Timeout, Default | Authorize_Termination |

Based the specific example above, a subscription to Service Group 004 might result in four mutually exclusive alternative call processing routes. First, if the subscriber had activated the Flexible Call Forwarding service, the call will be forwarded as shown in Alternative (1). Second, if the call forwarding service had not been activated, but the Internet Call Waiting service had been activated such as shown in Alternative (2), then the subscriber can exercise one of three options: (a) accept the call; (b) reject the call; and (c) ignore the call. Third, the Flexible Call Forwarding service may provide that all incoming calls be blocked if the subscriber has selected such an option. Finally, the service interaction rules might also include a default feature where after a certain time has elapsed, the call is automatically terminated.

The example shown above is only illustrative and is not an exhaustive list of the rules required for either the Flexible Call Forwarding service or the Internet Call Waiting service. For each feature SLP, the state after the feature SLP is executed must be identified with a corresponding next action. In some cases, the state after a feature SLP is executed will have a next action that responds to the SSP. In some cases, the next action will be to invoke the next feature SLP in the sequence.

Figure 3A:
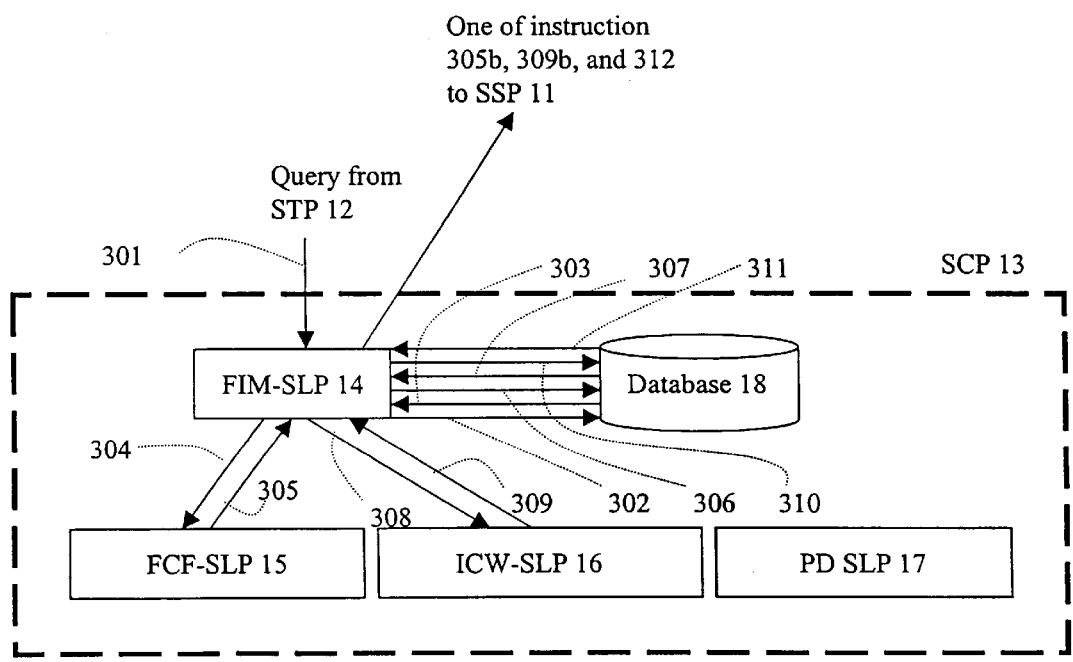
FIG. 3a is a schematic diagram illustrating a specific example of the manner in which the Feature Interaction Manager processes a query according to a preferred embodiment of the present invention.
Figure 3B:
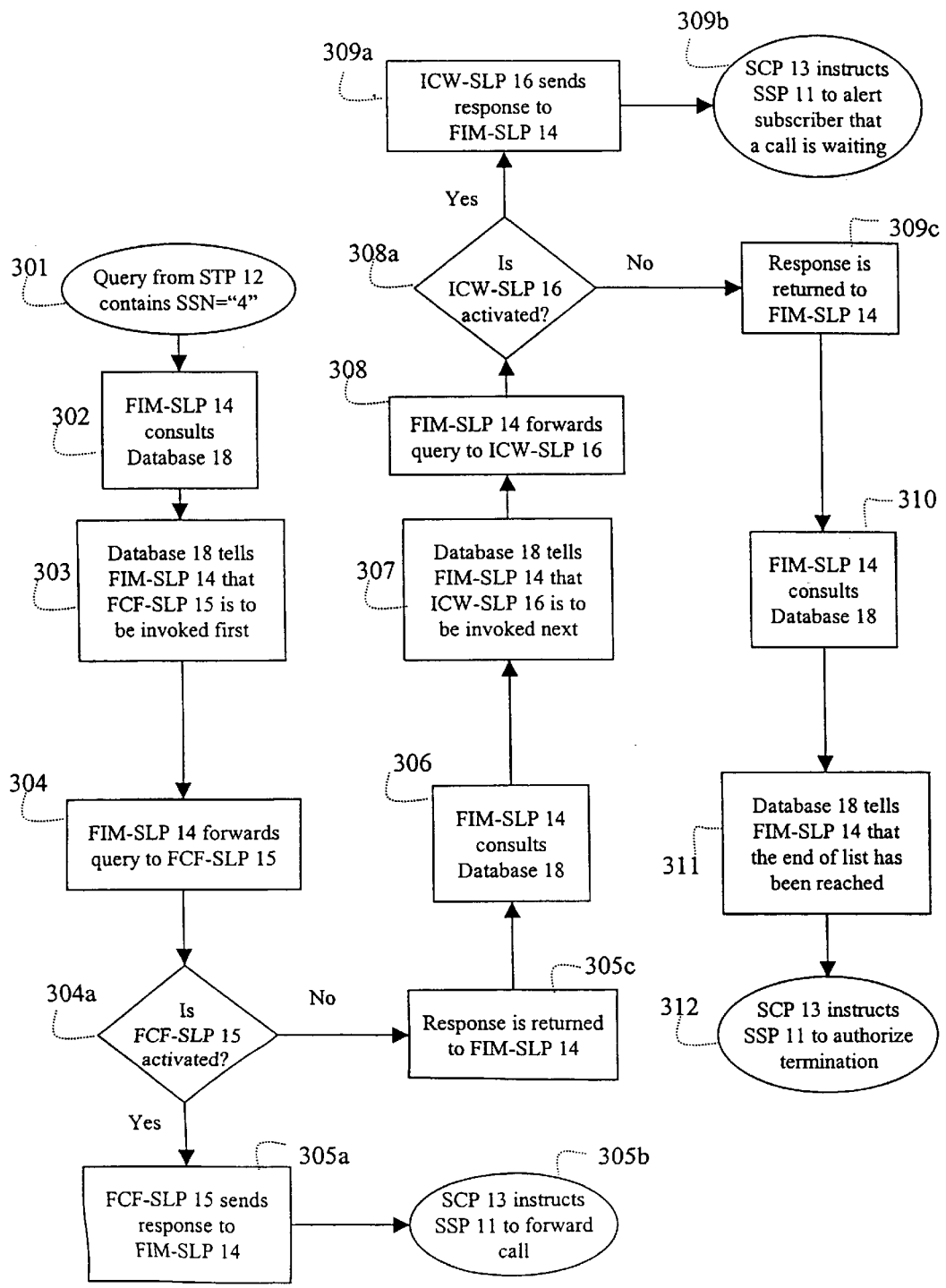
FIG. 3b is a flowchart illustrating a specific example of the steps by which the Feature Interaction Manager processes a query according to a preferred embodiment of the present invention.

FIG. 3a is a schematic diagram illustrating a specific example of the manner in which the Feature Interaction Manager processes a query according to a preferred embodiment of the present invention. FIG. 3b is a flowchart illustrating a specific example of the steps by which the Feature Interaction Manager processes a query according to a preferred embodiment of the present invention.

In this example, a caller has dialed "404-332-2166," the telephone number of a Multiple Services per Trigger subscriber. As described above, a query from the Multiple Services per Trigger subscriber's TAT 15 and SSP 11 prompts STP 12 to supply the subsystem number of "4" to SCP 13, such as that shown in step 301 (see FIG. 3b). In step 302, when Feature Interaction Manager SLP 14 (FIM-SLP 14) receives the query, it consults Database 18 that contains, among other information, Tables A, B, and C described above, and service interaction rules for each Service Group listed in Table A. From Table B, telephone number "404-332-2166" is associated with Service Group 004. From Table A, Service Group 004 provides that the Multiple Services per Trigger subscriber wants to have the Flexible Call Forwarding service invoked before the Internet Call Waiting service. As a result, in step 303, Database 18 tells Feature Interaction Manager SLP 14 to invoke Flexible Call Forwarding SLP 15 (FCF-SLP 15) first. The location of Flexible Call Forwarding SLP 15 can be obtained from Table C. In step 304, Feature Interaction Manager SLP 14 forwards the query to Flexible Call Forwarding SLP 15. In step 304a, if the Multiple Services per Trigger subscriber has activated the Flexible Call Forwarding service, Flexible Call Forwarding SLP 15 forwards a response to Feature Interaction Manager SLP 14 in step 305a. SCP 13 then instructs SSP 11, in step 305b, to forward the call per the response from Feature Interaction Manager SLP 14 to a forwarding telephone number that the Multiple Services per Trigger subscriber supplied when the subscriber activated the Flexible Call Forwarding service. Otherwise, the response is routed to Feature Interaction Manager SLP 14 for further processing in step 305c.

In step 306, Feature Interaction Manager SLP 14 consults Database 18 for the second time. Based on Table A, Database 18 tells Feature Interaction Manager SLP 14, in step 307, that Internet Call Waiting SLP 16 (ICW-SLP 16) is to be invoked next. In step 308, Feature Interaction Manager SLP 14 forwards the query to Internet Call Waiting SLP 16 and the Internet Call Waiting service is executed. In step 308a, if the Internet Call Waiting service has been activated, Internet Call Waiting SLP 16 sends a response to Feature Interaction Manager SLP 14 in step 309a to authorize SSP 11 to terminate the call. As a result, SCP 13 instructs SSP 11 in step 309b to alert the Multiple Services per Trigger subscriber that a call is waiting if the subscriber is engaged in a communication session with her Internet service provider. However, if the Internet Call Waiting service has not been activated, the response is returned to Feature Interaction Manager SLP 14 in step 309c. Feature Interaction Manager SLP 14 then consults Database 18 for the third time in step 310. Since Service Group 004 contains only two feature SLPs both of which have been invoked, Database 18 informs Feature Interaction Manager SLP 14 in step 311 that the end of the list has been reached. Based on the service interaction rules, Feature Interaction Manager SLP 14 responds to SSP 11 to authorize call termination and forwards that instruction to SSP 11 in step 312.

The interactions between Feature Interaction Manager SLP 14 and all feature SLPs are made possible through an SCP platform. In a preferred embodiment, an SCP platform capability that supports AIN inter-SLP communications may be used. In such an embodiment, the AIN messages defined in Bellcore generic requirements (e.g., GR-1299-CORE) for communicating between the SSP and SCP will also be used for inter-SLP communication between the Feature Interaction Manager SLP and feature SLPs.

Figure 4:
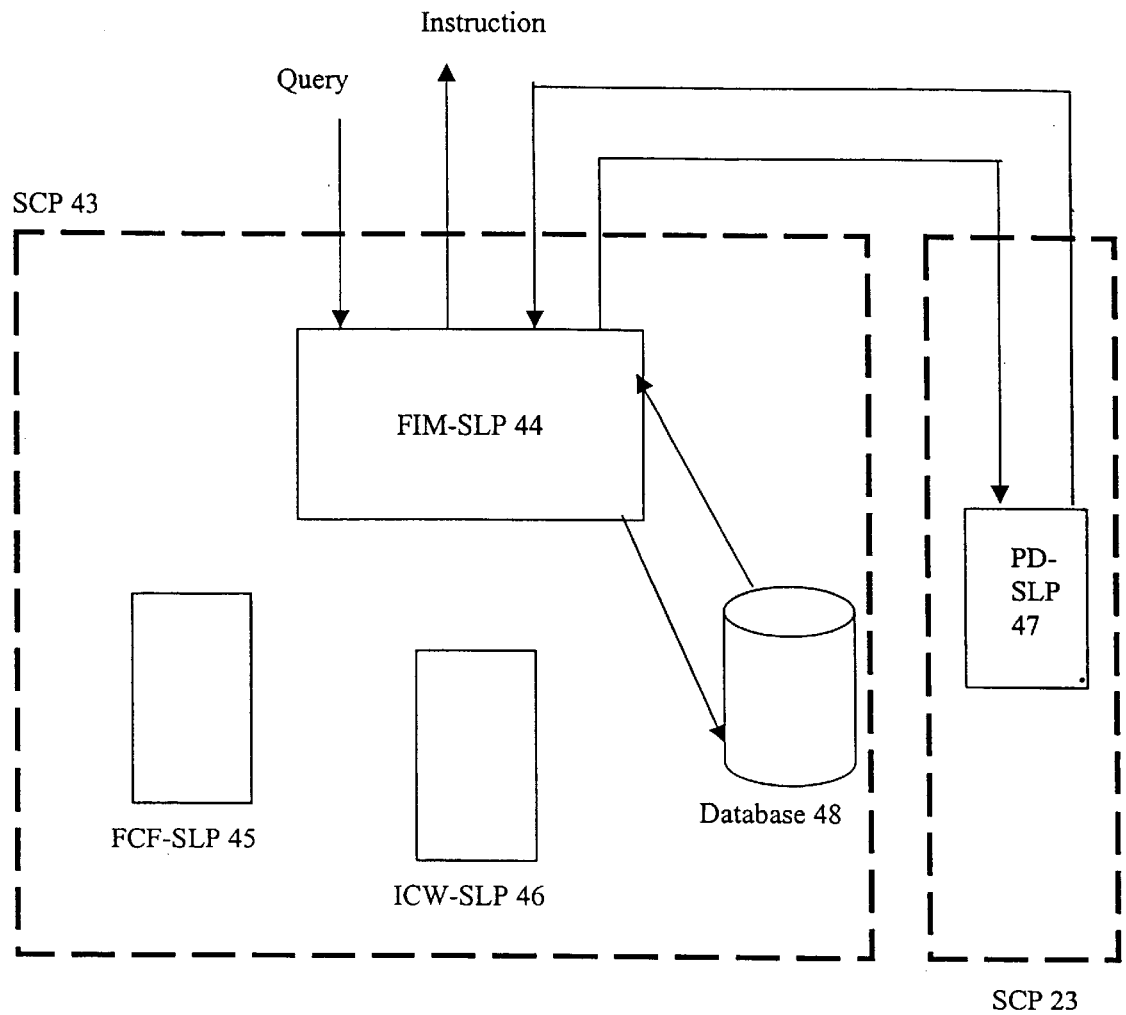
FIG. 4 is a schematic diagram illustrating a Feature Interaction Manager which manages feature service logic programs (SLPs) located in different service control points.

In a further embodiment illustrated in FIG. 4, a Feature Interaction Manager SLP can also manage feature SLPs located in different SCPs. As shown in the example of FIG. 4, Feature Interaction Manager SLP (FIM-SLP) 44, Flexible Call Forwarding (FCF) SLP 45, Internet Call Waiting (ICW) SLP 46, and Database 48 are located with SCP 43. Privacy Director SLP 47, however, is located within SCP 23. In this example, a query from the SSP of a customer subscribing to Service Group 003 (Privacy Director service only) is processed as follows.

Feature Interaction Manager SLP 44 consults Database 48 after it is invoked. Database 48 then informs Feature Interaction Manager SLP 44 that the feature SLP to be invoked, Privacy Director-SLP 17, is located in SCP 23. As a result, Feature Interaction Manager SLP 14 channels the query out of SCP 43, and routes the query via SS7 network to SCP 23 on which Privacy Director SLP 47 is located. After processing the call, Privacy Director SLP 47 returns the results to Feature Interaction Manager SLP 44. Finally, an instruction is given to the SSP from which the query had originated.

As illustrated in this example shown in FIG. 4, the present invention is capable of managing multiple feature SLPs located in different SCPs. In addition, the present invention is also capable of managing a single feature SLP. This capability allows the telephone company to add new services to a subscriber's line as they are ordered by the subscriber. To add new services to a subscriber's line, the telephone company just has to change the Translation Type of the TAT at the SSP if the Translation Type does not already specify the Translation Type corresponding to a Multiple Services per Trigger subscriber, and update Database 48 accordingly.

Figure 5:
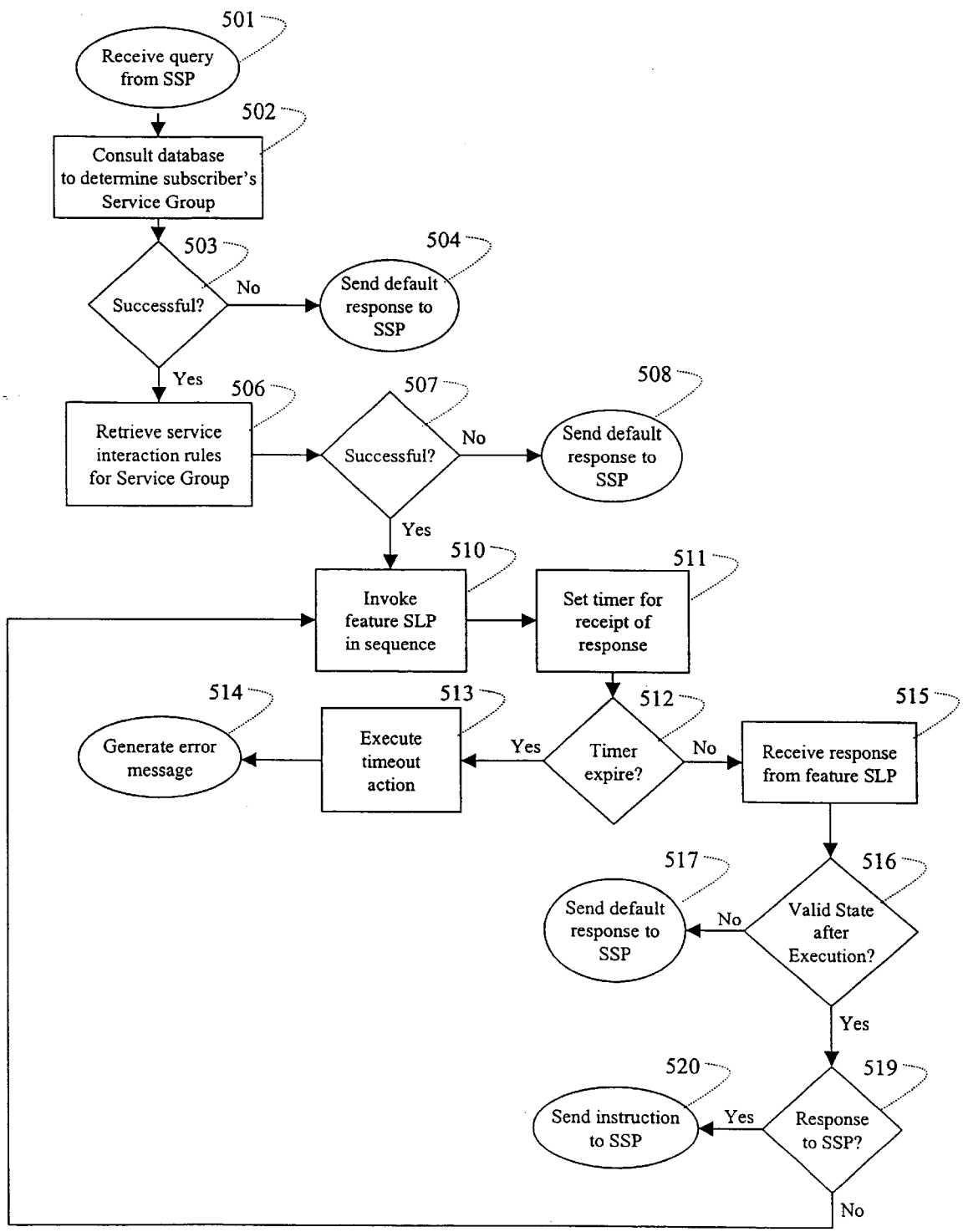
FIG. 5 is a flowchart illustrating the logic of a Feature Interaction Manager service logic program of the present invention.

FIG. 5 is a flowchart illustrating the logic of a preferred embodiment of a Feature Interaction Manager SLP of the present invention. As described above, the Feature Interaction Manager SLP is located within an SCP of an AIN structure. In step 501, the Feature Interaction Manager SLP receives a query from an SSP. In step 502, the Feature Interaction Manager SLP consults a database containing, among other information, a table similar to Table B discussed above, to find out which service group the subscriber belongs to. In step 503, if such inquiry is unsuccessful, e.g., the database is down, the Feature Interaction Manager SLP, in step 504, sends a default response to the SSP from which the query had originated. The default response could be, for example, an instruction containing an authorization for the SSP to terminate the call.

On the other hand, if the Feature Interaction Manager SLP is able to determine the service group to which the subscriber belongs, the Feature Interaction Manager SLP proceeds to step 506 to retrieve service interaction rules that are unique to the service group. In step 507, if the retrieval of service interaction rules is unsuccessful, the Feature Interaction Manager SLP, in step 508, sends the default response to the SSP. If the retrieval of service interaction rules is successful, the Feature Interaction Manager SLP, in step 510, invokes the first feature SLP specified in the service interaction rules. In step 511, the Feature Interaction Manager SLP sets a timer for the feature SLP to respond. One of ordinary skill in the art would understand that the time limit specified in step 511 must be shorter than the time limit set by the SSP for a response from the SCP. In step 512, if the timer expires before the invoked feature SLP responds, the Feature Interaction Manager SLP proceeds to step 513 to execute an appropriate timeout action or to generate an error message in step 514.

Otherwise, in step 515, the Feature Interaction Manager SLP receives a response from the first feature SLP, and it evaluates the response in step 516. If the response from the feature SLP is invalid or is otherwise not executable, the Feature Interaction Manager SLP sends the default response to the SSP in step 517. If the response from the feature SLP is valid (i.e., a response of the type that the Feature Interaction Manager SLP is expecting based on service interaction rules, such as forward the call or authorize termination), the Feature Interaction Manager SLP makes a further determination in step 519 whether to respond to the SSP. In step 519, the Feature Interaction Manager SLP evaluates the response based on the service interaction rules to determine if another SLP should be executed before a final response is sent to the service switching point. For example, if the Flexible Call Forwarding SLP responds with Allow_Call, Service Group 004 rules require that the Internet Call Waiting SLP be invoked before a response is sent to the service switching point. In that case, the process returns to step 510 to invoke the Internet Call Waiting SLP. On the other hand, if the response in step 519, in the case of Service Group 004, is "Forward-call" or "Block-call," the Feature Interaction Manager SLP proceeds to step 520 to send an appropriate instruction to the SSP.

Figure 6:
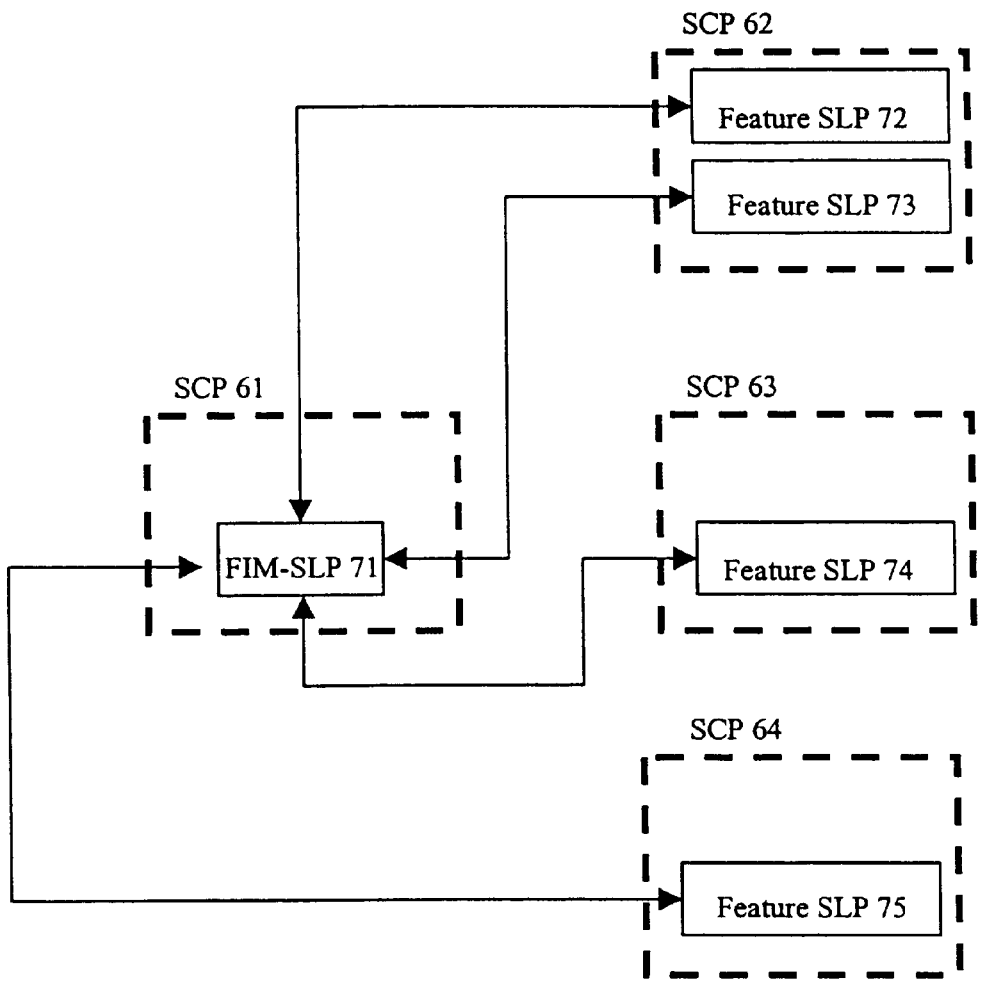
FIG. 6 is a schematic diagram illustrating another preferred embodiment of the present invention.

FIG. 6 is a schematic diagram showing another preferred embodiment of the present invention having multiple SCPs. As shown on FIG. 6, Feature Interaction Manager SLP (FIM-SLP) 71 resides on SCP 61 while feature SLP 72, feature SLP 73, feature SLP 74, and feature SLP 75 reside on other SCPs. As demonstrated, the present invention allows the Feature Interaction Manager SLP to reside on an SCP by itself, or on an SCP with one or more feature SLPs as shown in FIGS. 2a and 3a.

The specific types of AIN services identified above, namely Flexible Call Forwarding, Internet Call Waiting, Privacy Director, Advanced Intelligent Messaging, and Simultaneous Ringing, are provided as specific examples of services that the present invention can manage and is not intended to be an exhaustive list of types of such features. When used in this patent specification these terms are not intended to refer to any particular feature or service but rather to any feature or service generally of the type described below:

Flexible Call Forwarding service: upon receiving an incoming call directed to a first telephone number, forwarding the call to a second telephone number predetermined by the subscriber;

Internet Call Waiting: upon receiving an incoming call while the telephone line is connected to an Internet service provider, alerting the subscriber (called party) that an incoming call is waiting;

Privacy Director: screening all incoming calls and blocking calls originated by callers who do not supply their identities;

Advanced Intelligent Messaging: providing the calling party with a variety of options to leave messages for the subscriber; and Simultaneous Ringing: upon receiving an incoming call intended for a first telephone number; generating multiple calls to a list of predetermined telephone numbers.

The foregoing disclosure of embodiments of the present invention and specific examples illustrating the present invention have been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What we claim is:

1. A system comprising:
   a telephone switch;
   a telephone line in communication with the telephone switch, wherein the telephone line is associated with a subscriber;
   a trigger provisioned on the telephone line at the telephone switch, wherein the trigger is configured to detect an incoming call to the telephone line;
   two or more feature service logic programs in communication with the telephone switch, each of the two or more feature service logic programs is associated with a service subscribed by the subscriber; and
   a feature interaction manager service logic program in communication with the telephone switch and the two or more feature service logic programs,
   wherein when the trigger prompts the telephone switch to invoke the feature interaction manager service logic program, the feature interaction manager service logic program in turn invokes the two or more feature service logic programs according to an order predetermined by the subscriber.

2. The system of claim 1, wherein the trigger is a termination attempt trigger.

3. The system of claim 1, wherein one of the feature service logic programs is associated with a flexible call forwarding service.

4. The system of claim 1, wherein one of the feature service logic programs is associated with an Internet call waiting service.

5. The system of claim 1, wherein one of the feature service logic programs is associated with a privacy director service.

6. The system of claim 1, wherein one of the feature service logic programs is associated with an advanced intelligent messaging service.

7. The system of claim 1, wherein one of the feature service logic programs is associated with a simultaneous ringing service.

8. A method comprising:
   provisioning a trigger at a telephone switch associated with a telephone line of a subscriber in a telephone network;
   providing a plurality of feature service logic programs on the telephone network, each of the plurality of feature service logic programs is associated with a service subscribed by the subscriber;
   providing a feature interaction manager service logic program on the telephone network, wherein the feature interaction manager service logic program is configured to communicate with the trigger and the plurality of feature service logic programs,
   wherein when the trigger prompts the telephone switch to invoke the feature interaction manager service logic program, the feature interaction manager service logic program in turn invokes the plurality of feature service logic programs in an order predetermined by the subscriber.

9. The method of claim 8, wherein the trigger is a termination attempt trigger.

10. The method of claim 8, wherein one of the feature service logic programs is associated with a flexible call forwarding service.

11. The method of claim 8, wherein one of the feature service logic programs is associated with an Internet call waiting service.

12. The method of claim 8, wherein one of the feature service logic programs is associated with a privacy director service.

13. The method of claim 8, wherein one of the feature service logic programs is associated with an advanced intelligent messaging service.

14. The method of claim 8, wherein one of the feature service logic programs is associated with a simultaneous ringing service.

15. A telephone network comprising:
   a plurality of feature service logic programs, each of the plurality of feature service logic programs is associated with a service subscribed by a subscriber;
   a feature interaction manager service logic program configured to invoke one or more of the plurality of feature service logic programs, wherein the feature interaction manager service logic program is associated with a subsystem number;
   a database comprising service interaction rules for invoking one or more of the plurality of feature service logic programs in an order predetermined by the subscriber;
   wherein when a query having the subsystem number is received, the feature interaction manager service logic program invokes one or more of the plurality of feature service logic programs according to the service interaction rules.

16. The telephone network of claim 15, wherein the trigger is a termination attempt trigger.

17. The telephone network of claim 15, wherein one of the feature service logic programs is associated with a flexible call forwarding service.

18. The telephone network of claim 15, wherein one of the feature service logic programs is associated with an Internet call waiting service.

19. The telephone network of claim 15, wherein one of the feature service logic programs is associated with a privacy director service.

20. The telephone network of claim 15, wherein one of the feature service logic programs is associated with an advanced intelligent messaging service.

21. The telephone network of claim 15, wherein one of the feature service logic programs is associated with a simultaneous ringing service.

22. A method comprising:
   provisioning a trigger at a telephone switch, wherein the telephone switch is associated with a telephone line of a subscriber;
   receiving a query from the telephone switch;
   in response to the query, consulting a database containing service interaction rules regarding how two or more services subscribed by the subscriber are to be invoked, each of the two or more services subscribed by the subscriber is associated with a feature service logic program; and
   using a feature interaction service manager to manage a plurality of feature service logic programs associated with the two or more services subscribed by the subscriber according to the service interaction rules, wherein the service interaction rules specifies an order in which the plurality of feature service programs are to be invoked by the feature interaction manager service logic program, wherein the order is predetermined by the subscriber.

23. The method of claim 22, wherein the feature interaction manager is first invoked so that the feature interaction manager subsequently invokes at least one of the plurality of feature service logic programs according to the service interaction rules.

24. A method comprising:
   installing a feature interaction manager service logic program in a telephone network;

installing a first feature service logic program and a second feature service logic program on the telephone network, wherein the first and the second feature service logic programs are configured to be invoked by the feature interaction manager service logic program, each of the first and the second feature service logic programs is associated with a service subscribed by a subscriber;

installing service interaction rules for invoking the first feature service logic program and the second feature service logic program by the feature interaction manager service logic program, wherein the service interaction rules are accessible to the feature interaction manager service logic program;

provisioning a trigger on a telephone switch associated with a telephone line of the subscriber of the services associated with the first and the second feature service logic programs;

receiving a call intended for the subscriber at the telephone switch;

invoking the feature interaction manager service logic program; and managing, in the feature interaction manager, the first and second feature service logic programs according to the service interaction rules, wherein the service interaction rules specifies an order in which the first feature service logic program and the second feature service program are to be invoked by the feature interaction manager service logic program, wherein the order is predetermined by the subscriber.

25. The method of claim 24, wherein the feature interaction manager service logic program is first invoked so that it subsequently invokes at least one of the first feature service logic program and the second feature service logic program according to the service interaction rules.

26. The method of claim 24, wherein the trigger is a termination attempt trigger.

27. The method of claim 24, wherein one of the feature service logic programs is associated with a flexible call forwarding service.

28. The method of claim 24, wherein one of the feature service logic programs is associated with an Internet call waiting service.

29. The method of claim 24, wherein one of the feature service logic programs is associated with a privacy director service.

30. The method of claim 24, wherein one of the feature service logic programs is associated with an advanced intelligent messaging service.

31. The method of claim 24, wherein one of the feature service logic programs is associated with a simultaneous ringing service.

32. The method of claim 24, wherein the feature interaction manager service logic program returns a default response to the telephone switch as specified in the service interaction rules when none of the first and second feature service logic programs has been activated.

33. The method of claim 32, wherein the default response is an instruction authorizing call termination.

34. A telephone system comprising:
a telephone line;
a telephone switch that is connected to the telephone line;
a trigger provisioned on the telephone line at the telephone switch;
a feature interaction manager service logic program configured to communicate with the telephone switch;
a first feature service logic program and a second feature service logic program, each of the first feature service logic program and the second feature service logic program is associated with a service subscribed by a subscriber associated with the telephone line; and means for managing the first feature service logic program and the first feature service logic program according to a set of service interaction rules, wherein the service interaction rules specifies an order in which the first feature service logic program and the second feature service program are to be invoked by the feature interaction manager service logic program, wherein the order is predetermined by the subscriber of services associated with the first feature service logic program and the second feature service program.

35. The telephone system of claim 34, wherein the trigger is a termination attempt trigger.

36. The telephone system of claim 34, wherein one of the feature service logic programs is associated with a flexible call forwarding service.

37. The telephone system of claim 34, wherein one of the feature service logic programs is associated with an Internet call waiting service.

38. The telephone system of claim 34, wherein one of the feature service logic programs is associated with a privacy director service.

39. The telephone system of claim 34, wherein one of the feature service logic programs is associated with an advanced intelligent messaging service.

40. The telephone system of claim 34, wherein one of the feature service logic programs is associated with a simultaneous ringing service.

41. A method comprising:
installing a feature interaction manager service logic program in a telephone network;
installing a plurality of feature service logic programs on the telephone networks each of the plurality of feature service logic programs is associated with a service subscribed by the subscriber, wherein the plurality of service logic programs are configured to be invoked by the feature interaction manager service logic program to provide services including flexible call forwarding, Internet call waiting, privacy director, advanced intelligent messaging, and simultaneous ringing;
installing service interaction rules, wherein the service interaction rules specifies an order predetermined by the subscriber of the services to invoke the plurality of feature service programs;
provisioning a trigger on a telephone switch associated with a telephone line of the subscriber;
receiving a call intended for the subscriber at the telephone switch;
invoking the feature interaction manager service logic program; and
managing, in the feature interaction manager, the plurality of feature service logic programs according to the service interaction rules.

42. The method of claim 41, wherein the trigger is a termination attempt trigger.

43. The method of claim 41, wherein the feature interaction manager service logic program returns a default response to the switch when none of the plurality of feature service logic programs has been activated.

44. The method of claim 41, wherein the default response is an instruction authorizing call termination.

* * * * *